United States Patent
Watanabe

(10) Patent No.: US 10,933,864 B2
(45) Date of Patent: Mar. 2, 2021

(54) VEHICLE STABILITY CONTROL DEVICE

(71) Applicant: TOYOTA JIDOSHA KABUSHIKI KAISHA, Toyota (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/148,013

(22) Filed: Oct. 1, 2018

(65) Prior Publication Data

US 2019/0161077 A1 May 30, 2019

(30) Foreign Application Priority Data

Nov. 28, 2017 (JP) .............................. JP2017-228172

(51) Int. Cl.
*B60W 30/02* (2012.01)
*B60W 40/114* (2012.01)
(Continued)

(52) U.S. Cl.
CPC ...... *B60W 30/02* (2013.01); *B60W 30/18145* (2013.01); *B60W 40/114* (2013.01);
(Continued)

(58) Field of Classification Search
USPC .......................................................... 701/83
See application file for complete search history.

(56) References Cited

U.S. PATENT DOCUMENTS

| 10,384,672 B1* | 8/2019 | Katzourakis | .......... B60W 30/04 |
| 2010/0186492 A1* | 7/2010 | Morinaga | ............... B60C 11/24 |
| | | | 73/146 |

(Continued)

FOREIGN PATENT DOCUMENTS

| JP | 2002-221527 A | 8/2002 |
| JP | 2008-247126 A | 10/2008 |

OTHER PUBLICATIONS

Office Action dated Jul. 27, 2020 issued by the U.S. Patent and Trademark Office during the prosecution of U.S. Appl. No. 16/135,139.
(Continued)

*Primary Examiner* — Aniss Chad
*Assistant Examiner* — Mahmoud M Kazimi
(74) *Attorney, Agent, or Firm* — Sughrue Mion, PLLC

(57) ABSTRACT

A vehicle stability control device is mounted on a vehicle in which a front tire wears faster than a rear tire. Understeer degree increases as a target yaw rate becomes higher than an actual yaw rate. When the understeer degree exceeds a first activation threshold, vehicle stability control is activated. When the understeer degree exceeds a second activation threshold, rear brake control that applies a braking force to an inner rear wheel is activated. A wear degree parameter is wear degree of the front tire or a difference in wear degree between the front tire and the rear tire. In response to a fact that the wear degree parameter exceeds a first wear threshold, the vehicle stability control device performs rear wear promotion processing that changes the second activation threshold to an adjusted value smaller than a default value and the first activation threshold.

5 Claims, 16 Drawing Sheets

(51) Int. Cl.
*B60W 30/18* (2012.01)
*B60W 30/045* (2012.01)
(52) U.S. Cl.
CPC ..... *B60W 2520/14* (2013.01); *B60W 2530/20* (2013.01); *B60W 2710/18* (2013.01)

(56) References Cited

U.S. PATENT DOCUMENTS

2018/0265091 A1* 9/2018 Ienaga ................... B60K 23/04
2019/0001757 A1* 1/2019 Singh .................... B60C 11/246
2019/0152454 A1 5/2019 Watanabe
2019/0241176 A1* 8/2019 Suzuki ................... B60L 15/20

OTHER PUBLICATIONS

U.S. Appl. No. 16/135,139 filed Sep. 19, 2018.
Notice of Allowance issued Nov. 6, 2020 by the United States Patent Office in U.S. Appl. No. 16/135,139.

* cited by examiner

VEHICLE STABILITY CONTROL DEVICE

BACKGROUND

Technical Field

The present disclosure relates to a vehicle stability control device that performs vehicle stability control in consideration of tire wear.

Background Art

Vehicle stability control is a function to suppress sideslip and spin to stabilize vehicle behavior during a turn of a vehicle. More specifically, a target yaw rate is calculated according to a vehicle speed and a steering angle. Meanwhile, an actual yaw rate is detected by a yaw rate sensor. An understeer tendency or an oversteer tendency is detected based on a deviation between the target yaw rate and the actual yaw rate. When the understeer tendency or the oversteer tendency exceeds a certain level, the vehicle stability control is activated. In the vehicle stability control, a braking force and/or a driving force of each wheel is appropriately controlled in order to stabilize the vehicle behavior.

Patent Literature 1 discloses a wear state detection device that detects a wear state of a tire. The wear state detection device calculates a vehicle speed, a vehicle acceleration, and a slip ratio of each tire, based on a rotational speed of each tire. Subsequently, the wear state detection device calculates a linear regression coefficient and a correlation coefficient between the vehicle acceleration and the slip ratio. Furthermore, the wear state detection device accumulates the linear regression coefficient when the correlation coefficient is equal to or higher than a predetermined value, and calculates an average value of a predetermined number of accumulated linear regression coefficients. Then, the wear state detection device detects the wear state of the tire based on the calculated average value of the linear regression coefficient.

Patent Literature 2 discloses a method that estimates a tire radius of a vehicle during traveling and detects a wear state of the tire based on the estimated tire radius. According to the method, an absolute velocity of the vehicle is calculated by the use of a GPS (Global Positioning System) mounted on the vehicle. Then, the tire radius is calculated based on the absolute velocity of the vehicle and a rotation angular velocity of the tire.

LIST OF RELATED ART

Patent Literature 1: Japanese Laid-Open Patent Publication No. 2002-221527

Patent Literature 2: Japanese Laid-Open Patent Publication No. 2008-247126

SUMMARY

In a case of a general vehicle, a front side is heavier than a rear side, and thus a front tire wears faster than a rear tire. When the front tire wears faster than the rear tire, cornering power of the front tire relatively decreases, and thus a steering characteristic of the vehicle shifts to an understeer side.

Meanwhile, an equation for calculating the target yaw rate is defined based on the steering characteristic in an initial state before the tire wears. Therefore, when the front tire wears faster than the rear tire, the calculated target yaw rate deviates from an actual steering characteristic and becomes higher than an actual yaw rate. As a result, the vehicle stability control is possibly activated unnecessarily early. In other words, there is a possibility that the vehicle stability control is activated unnecessarily, although the vehicle stability control is actually unnecessary. This causes decrease in confidence in the vehicle stability control, which is not preferable.

An object of the present disclosure is to provide a technique that can suppress unnecessary early activation of the vehicle stability control caused by the front tire wearing faster than the rear tire.

A first disclosure provides a vehicle stability control device mounted on a vehicle in which a front tire wears faster than a rear tire.

The vehicle stability control device includes a control device configured to perform vehicle stability control processing and wear adjusting processing.

The vehicle stability control processing includes:
calculating a target yaw rate according to a vehicle speed and a steering angle;
calculating understeer degree that increases as the target yaw rate becomes higher than an actual yaw rate; and
controlling at least one of a braking force and a driving force of each wheel to stabilize vehicle behavior, when the understeer degree exceeds a first activation threshold.

The wear adjusting processing includes:
rear brake control that applies a braking force to an inner rear wheel when the understeer degree exceeds a second activation threshold;
wear degree calculation processing that calculates a wear degree parameter being wear degree of the front tire or a difference in wear degree between the front tire and the rear tire; and
rear wear promotion processing that changes the second activation threshold to an adjusted value smaller than a default value and the first activation threshold in response to a fact that the wear degree parameter exceeds a first wear threshold.

A second disclosure further has the following feature in addition to the first disclosure.

The wear adjusting processing further includes:
return processing that returns the second activation threshold to the default value in response to a fact that the wear degree parameter falls below a second wear threshold smaller than the first wear threshold.

A third disclosure further has the following feature in addition to the first or second disclosure.

A control amount of the braking force applied to the inner rear wheel in the rear brake control is a rear brake control amount.

The control device sets the rear brake control amount when the second activation threshold is the adjusted value to be smaller than the rear brake control amount when the second activation threshold is the default value.

A fourth disclosure further has the following feature in addition to any one of the first to third disclosures.

The wear degree calculation processing includes:
calculating, as a front tire coefficient, a slope of a line representing a relationship between a slip ratio of the front tire and a vehicle acceleration;
retaining an initial value of the front tire coefficient as an initial front tire coefficient; and
calculating an amount of change in the front tire coefficient from the initial front tire coefficient as the wear degree parameter representing the wear degree of the front tire.

A fifth disclosure further has the following feature in addition to any one of the first to third disclosures.

The wear degree calculation processing includes:
calculating, as a front tire coefficient, a slope of a line representing a relationship between a slip ratio of the front tire and a vehicle acceleration;
calculating, as a rear tire coefficient, a slope of a line representing a relationship between a slip ratio of the rear tire and the vehicle acceleration;
retaining an initial value of the front tire coefficient as an initial front tire coefficient;
retaining an initial value of the rear tire coefficient as an initial rear tire coefficient; and
calculating the wear degree parameter representing the difference in the wear degree between the front tire and the rear tire, wherein the wear degree of the front tire is an amount of change in the front tire coefficient from the initial front tire coefficient, and the wear degree of the rear tire is an amount of change in the rear tire coefficient from the initial rear tire coefficient.

When the wear degree parameter increases, the calculated target yaw rate deviates from the actual steering characteristic and becomes higher than the actual yaw rate, which causes the unnecessary early activation of the vehicle stability control. According to the present disclosure, in response to a fact that the wear degree parameter exceeds the first wear threshold, the second activation threshold for the rear brake control is changed from the default value to the adjusted value. The adjusted value is smaller than the default value and the first activation threshold for the vehicle stability control. Therefore, a frequency of activation of the rear brake control increases and thus the wear of the rear tire is effectively promoted. When the wear of the rear tire is promoted, a difference in the wear degree between the front tire and the rear tire decreases and thus the wear degree parameter decreases. As a result, the unnecessary early activation of the vehicle stability control is suppressed.

EMBODIMENTS

Embodiments of the present disclosure will be described below with reference to the attached drawings.

1. Outline

Figure 1:
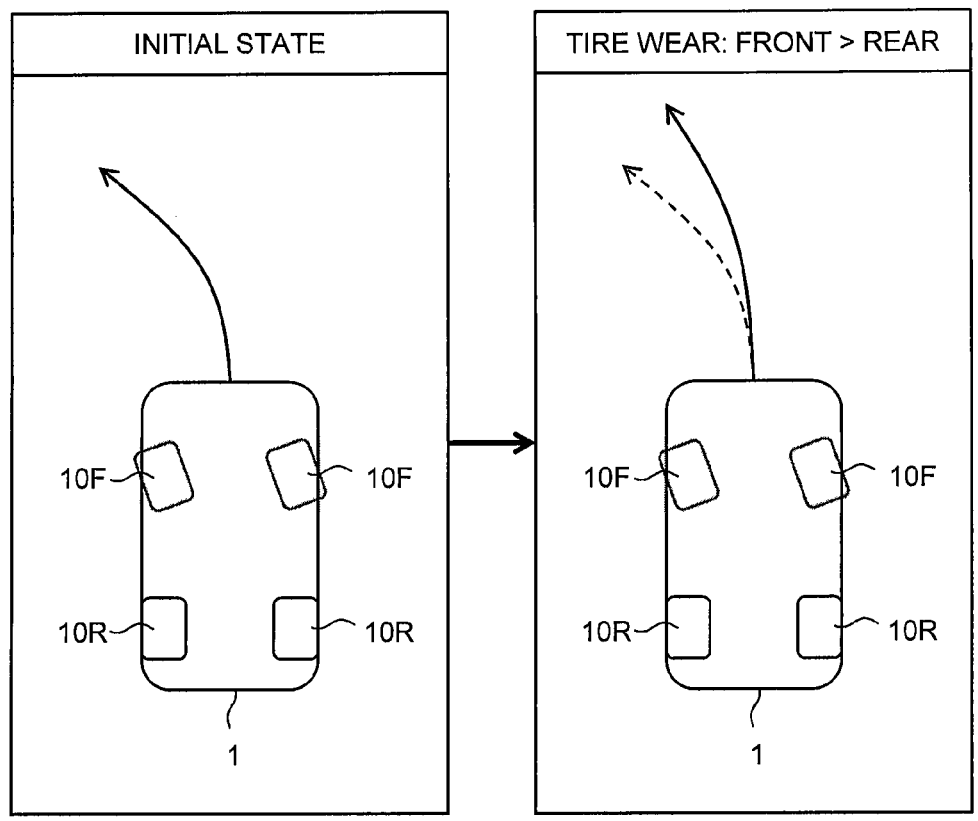
FIG. 1 is a conceptual diagram for explaining an influence of tire wear on a steering characteristic of a vehicle according to an embodiment of the present disclosure.

FIG. 1 is a conceptual diagram for explaining an influence of tire wear on a steering characteristic (turning performance) of a vehicle 1 according to the present embodiment. The vehicle 1 has tires 10. The tires 10 include a front tire 10F on a front side and a rear tire 10R on a rear side. In the vehicle 1, the front side is heavier than the rear side, and thus the front tire 10F wears faster than the rear tire 10R. When the front tire 10F wears faster than the rear tire 10R, cornering power of the front tire 10F relatively decreases, and thus the steering characteristic of the vehicle 1 shifts to an understeer side.

Such the change in the steering characteristic caused by the tire wear influences "vehicle stability control (VSC; Vehicle Stability Control)".

The vehicle stability control is a function to suppress sideslip and spin to stabilize vehicle behavior during a turn of the vehicle 1. More specifically, a target yaw rate Yr_st is calculated according to a vehicle speed and a steering angle. Meanwhile, an actual yaw rate Yr is detected by a yaw rate sensor. A difference between the target yaw rate Yr_st and the actual yaw rate Yr is a yaw rate deviation ΔYr1. Based on the yaw rate deviation ΔYr1, an understeer tendency or an oversteer tendency is detected. For example, when the actual yaw rate Yr is lower than the target yaw rate Yr_st, it indicates the understeer tendency. When the understeer tendency or the oversteer tendency exceeds a certain level, the vehicle stability control is activated. In the vehicle stability control, a braking force and/or a driving force of each wheel is appropriately controlled in order to stabilize the vehicle behavior.

Here, an equation for calculating the target yaw rate Yr_st is defined based on the steering characteristic in an initial state before the tire 10 wears. For example, the equation for calculating the target yaw rate Yr_st is defined under a condition that the front tire 10F and the rear tire 10R have the same characteristics. Therefore, when the front tire 10F wears faster than the rear tire 10R, the calculated target yaw rate Yr_st deviates from an actual steering characteristic.

More specifically, since the actual steering characteristic shifts to the understeer side as shown in FIG. 1, the target yaw rate Yr_st becomes higher than the actual yaw rate Yr reflecting the actual steering characteristic.

Figure 2:
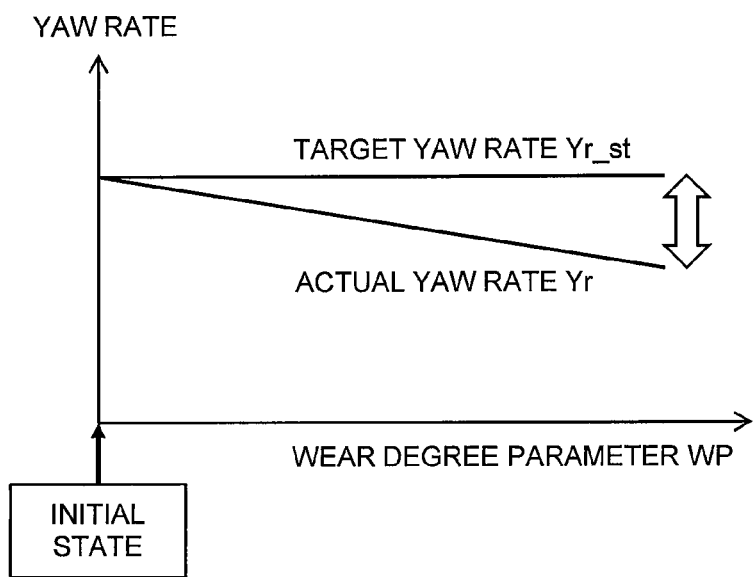
FIG. 2 is a conceptual diagram showing a relationship between a wear degree parameter, a target yaw rate, and an actual yaw rate.

FIG. 2 is a conceptual diagram showing a relationship between a wear degree parameter WP, the target yaw rate Yr_st, and the actual yaw rate Yr.

The "wear degree parameter WP" is a parameter reflecting a difference in wear degree between the front tire 10F and the rear tire 10R. The wear degree of the front tire 10F is hereinafter referred to as "front wear degree Wf". The wear degree of the rear tire 10R is hereinafter referred to as "rear wear degree Wr". Since the front tire 10F wears faster than the rear tire 10R, the front wear degree Wf becomes higher than the rear wear degree Wr (Wf>Wr). The wear degree parameter WP can be a difference between the front wear degree Wf and the rear wear degree Wr (i.e. WP=Wf−Wr) or the front wear degree Wf (i.e. WP=Wf). The reason is that there is a positive correlation between "Wf−Wr" and "Wf" due to the relationship of "Wf>Wr". In either case, the wear degree parameter WP increases as the vehicle 1 continues to travel without the tire 10 being changed.

In FIG. 2, the target yaw rate Yr_st is calculated under a constant calculation condition (vehicle speed and steering angle). When the tire wear is not considered in the equation for calculating the target yaw rate Yr_st, the calculated target yaw rate Yr_st is constant regardless of the wear degree parameter WP. In the initial state before the tire 10 wears, the target yaw rate Yr_st is consistent with the actual yaw rate Yr.

However, as described above, as the wear degree parameter WP increases, the actual steering characteristic shifts to the understeer side, that is, the actual yaw rate Yr decreases. As a result, the target yaw rate Yr_st becomes higher than the actual yaw rate Yr and thus the yaw rate deviation ΔYr1 increases. This yaw rate deviation ΔYr1 is caused by the deviation of the target yaw rate Yr_st from the actual state and not caused by unstable behavior during vehicle turning. Therefore, the vehicle stability control is possibly activated unnecessarily early. In other words, there is a possibility that the vehicle stability control is activated unnecessarily, although the vehicle stability control is actually unnecessary. This causes decrease in confidence in the vehicle stability control, which is not preferable.

In view of the above, according to the present embodiment, "wear adjusting processing" is performed in order to suppress the unnecessary early activation of the vehicle stability control. In the wear adjusting processing, the wear degree parameter WP is calculated (estimated) and monitored. When the wear degree parameter WP exceeds a certain level, "rear wear promotion processing" for promoting wear of the rear tire 10R is performed. When the wear of the rear tire 10R is promoted, the difference in the wear degree between the front tire 10F and the rear tire 10R decreases and thus the wear degree parameter WP decreases. It is thus possible to suppress the unnecessary early activation of the vehicle stability control caused by the front tire 10F wearing faster than the rear tire 10R.

Hereinafter, the vehicle stability control processing and the wear adjusting processing according to the present embodiment will be described in more detail.

2. Vehicle Stability Control Processing

First, the vehicle stability control processing in the present embodiment will be described. The target yaw rate Yr_st and the yaw rate deviation ΔYr1 are expressed by the following equations (1) and (2), respectively.

[Equation 1]
$$Yr\_st = \frac{V \times St}{n \times l} \frac{1}{1 + Kh \times V^2} \quad (1)$$

[Equation 2]
$$\Delta Yr1 = Yr\_st - Yr \quad (2)$$

Here, V is the vehicle speed, St is the steering angle, n is a steering gear ratio, l is a wheelbase, and Kh is a stability factor. The stability factor Kh is a parameter representing the steering characteristic of the vehicle 1 and is preset. An equivalent steering angle DV equivalent to the yaw rate deviation ΔYr1 is expressed by the following equation (3).

[Equation 3]
$$DV = \frac{\Delta Yr1 \times n \times l}{V} \quad (3)$$

A sign of each of the steering angle St and the yaw rate differs depending on whether a turning direction is left or right. Multiplying the equivalent steering angle DV by the sign gives a "drift state". When the drift state is a positive value, it means the understeer tendency. On the other hand, when the drift state is a negative value, it means the oversteer tendency. In the present embodiment, we focus particularly on the case where the drift state is a positive value. In that sense, the drift state is hereinafter referred to as "understeer degree DUS" indicating strength of the understeer tendency. The understeer degree DUS increases as the target yaw rate Yr_st becomes higher than the actual yaw rate Yr, that is, the yaw rate deviation ΔYr1 becomes larger.

Figure 3:
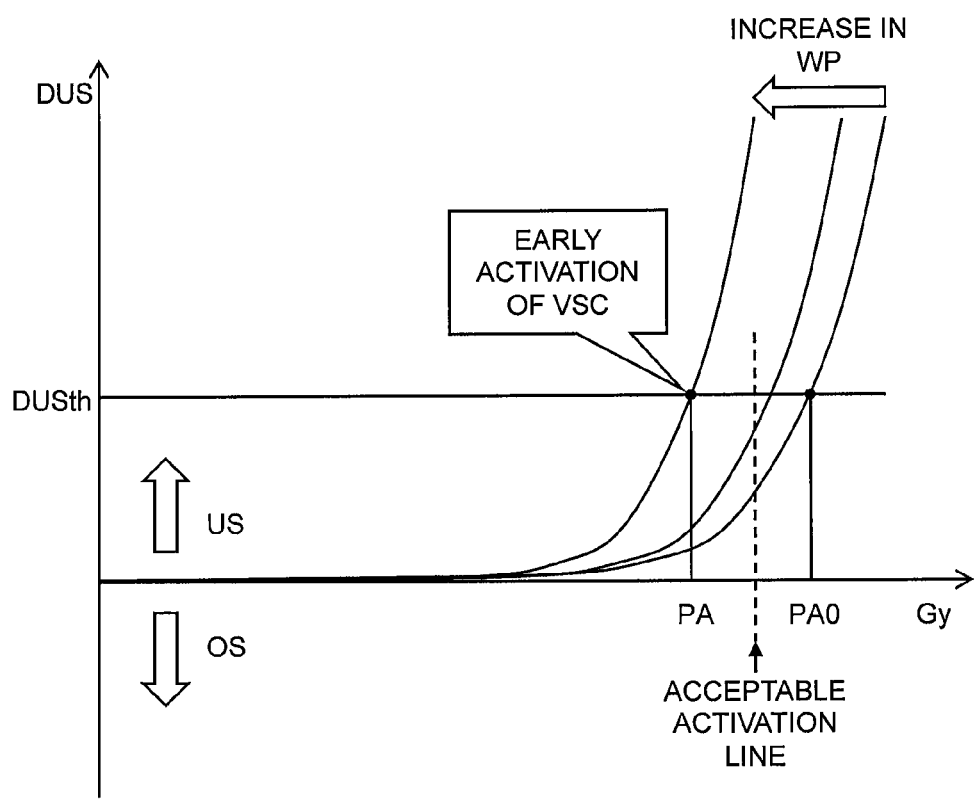
FIG. 3 is a conceptual diagram for explaining activation of vehicle stability control.

FIG. 3 is a conceptual diagram for explaining activation of the vehicle stability control. A vertical axis represents the understeer degree DUS, and a horizontal axis represents a lateral acceleration Gy. In the example shown in FIG. 3, the understeer degree DUS increases as the lateral acceleration Gy becomes higher. An activation threshold for the vehicle stability control is hereinafter referred to as a "first activation threshold DUSth". That is, when the understeer degree DUS exceeds the first activation threshold DUSth, the vehicle stability control is activated. In the vehicle stability control, the braking force and/or the driving force of each wheel is appropriately controlled in order to stabilize the vehicle behavior.

In FIG. 3, the lateral acceleration Gy at the time when the vehicle stability control is activated is denoted by an activation point PA. The activation point PA in the initial state before the tire 10 wears is an initial activation point PA0. As described above, when the wear degree parameter WP increases, the target yaw rate Yr_st becomes higher than the actual yaw rate Yr reflecting the actual steering characteristic and thus the yaw rate deviation ΔYr1 increases (see FIG. 2). As the yaw rate deviation ΔYr1 increases, the understeer degree DUS also increases and thus the vehicle stability control becomes more easily activated. This is the unnecessary early activation of the vehicle stability control. In particular, it is not preferable that the activation point PA becomes earlier than an acceptable activation line.

In view of the above, according to the present embodiment, the wear adjusting processing is performed in order to suppress the unnecessary early activation of the vehicle stability control.

3. Wear Adjusting Processing

3-1. Rear Brake Control

Figure 4:
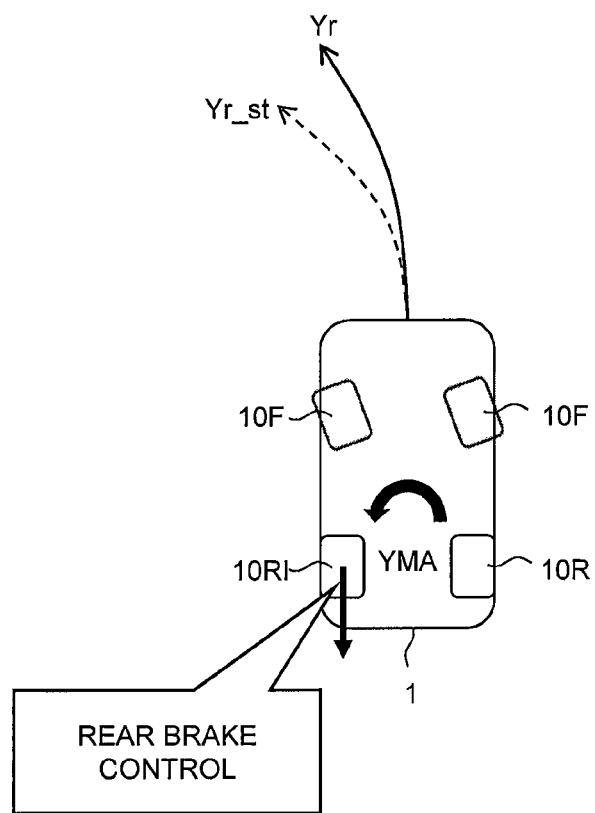
FIG. 4 is a conceptual diagram for explaining rear brake control according to the embodiment of the present disclosure.

First, "rear brake control" used in the wear adjusting processing according to the present embodiment is described with reference to FIG. 4. The rear brake control is a function to assist a turn of the vehicle 1 during the turn. More specifically, when a turn state of the vehicle 1 is in the understeer tendency, the rear brake control applies a braking force to an inner rear wheel 10RI to generate an assist yaw moment YMA in an direction assisting the vehicle turn. Due to the assist yaw moment YMA, the vehicle 1 can more easily turn to a desired direction.

Figure 5:
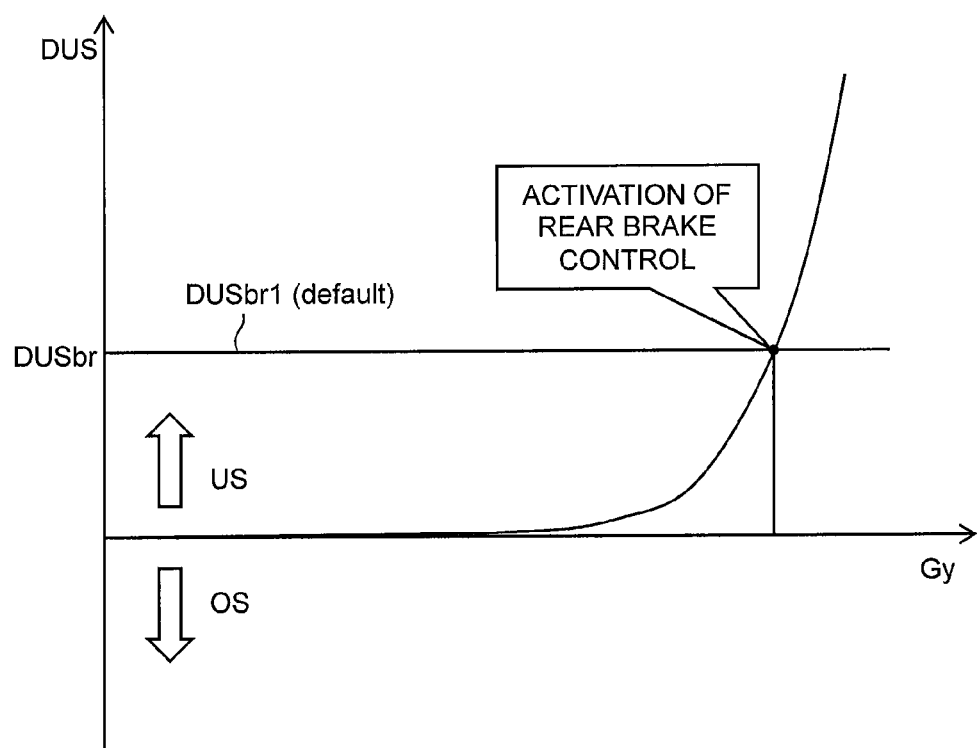
FIG. 5 is a conceptual diagram for explaining activation of the rear brake control according to the embodiment of the present disclosure.

FIG. 5 is a conceptual diagram for explaining activation of the rear brake control. The format of FIG. 5 is the same as the foregoing FIG. 3. An activation threshold for the rear brake control is hereinafter referred to as a "second activation threshold DUSbr". That is, when the understeer degree DUS exceeds the second activation threshold DUSbr, the rear brake control is activated. In the rear brake control, the braking force is applied to the inner rear wheel 10RI in order to generate the assist yaw moment YMA.

As will be described later, the second activation threshold DUSbr for the rear brake control is not constant but variable. A default value of the second activation threshold DUSbr is hereinafter denoted by "DUSbr1". For example, the default value DUSbr1 may be the same as the above-mentioned first activation threshold DUSth for the vehicle stability control.

Although the rear brake control is somewhat similar to the above-described vehicle stability control, control of the driving force and the braking force of the front tire 10F is not performed in the rear brake control. In the present embodiment, the rear brake control and the vehicle stability control are treated as different controls.

3-2. Wear Degree Calculation Processing

Next, calculation (estimation) of the wear degree parameter WP is described. The wear degree parameter WP is the difference between the front wear degree Wf and the rear wear degree Wr (i.e. WP=Wf−Wr) or the front wear degree Wf (i.e. WP=Wf), as mentioned above.

Figure 6:
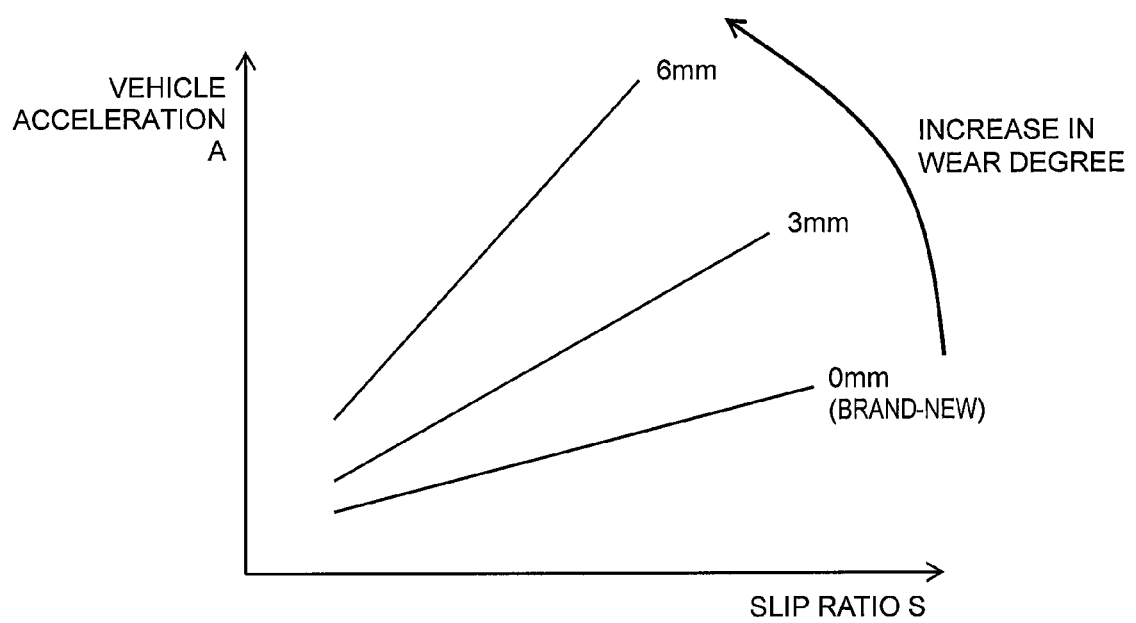
FIG. 6 is a conceptual diagram for explaining dependence of tire characteristics on wear degree.

FIG. 6 is a conceptual diagram for explaining dependence of tire characteristics on the wear degree. A horizontal axis represents a slip ratio S of a certain tire 10, and a vertical axis represents a vehicle acceleration A being an acceleration of the vehicle 1. In a region where the slip ratio S is not so high, the vehicle acceleration A is almost proportional to the slip ratio S. A slope of a line representing the relationship between the slip ratio S and the vehicle acceleration A is hereinafter referred to as a "tire coefficient".

As shown in FIG. 6, the tire coefficient has wear degree dependence. More specifically, the tire coefficient becomes larger as the wear degree of the tire 10 increases. Therefore, it is possible to estimate the wear degree of the tire 10 based on a relative change in the tire coefficient from the initial state.

Calculation of the front wear degree Wf is as follows. A slope of a line representing a relationship between a slip ratio Sf of the front tire 10F and the vehicle acceleration A is calculated as a "front tire coefficient Kf". The front tire coefficient Kf in the initial state, that is, an initial value of the front tire coefficient Kf is an "initial front tire coefficient KfM". Then, an amount of change in the front tire coefficient Kf from the initial front tire coefficient KfM is calculated as the front wear degree Wf.

Calculation of the rear wear degree Wr is as follows. A slope of a line representing a relationship between a slip ratio Sr of the rear tire 10R and the vehicle acceleration A is calculated as a "rear tire coefficient Kr". The rear tire coefficient Kr in the initial state, that is, an initial value of the rear tire coefficient Kr is an "initial rear tire coefficient KrM". Then, an amount of change in the rear tire coefficient Kr from the initial rear tire coefficient KrM is calculated as the rear wear degree Wr.

In this manner, according to the present embodiment, the wear degree is calculated based on the amount of relative change in the tire coefficient from the initial value. In order to explain merits of this method, let us consider a method disclosed in the above-mentioned Patent Literature 1 (Japanese Laid-Open Patent Publication No. 2002-221527) as a comparative example.

Figure 7:
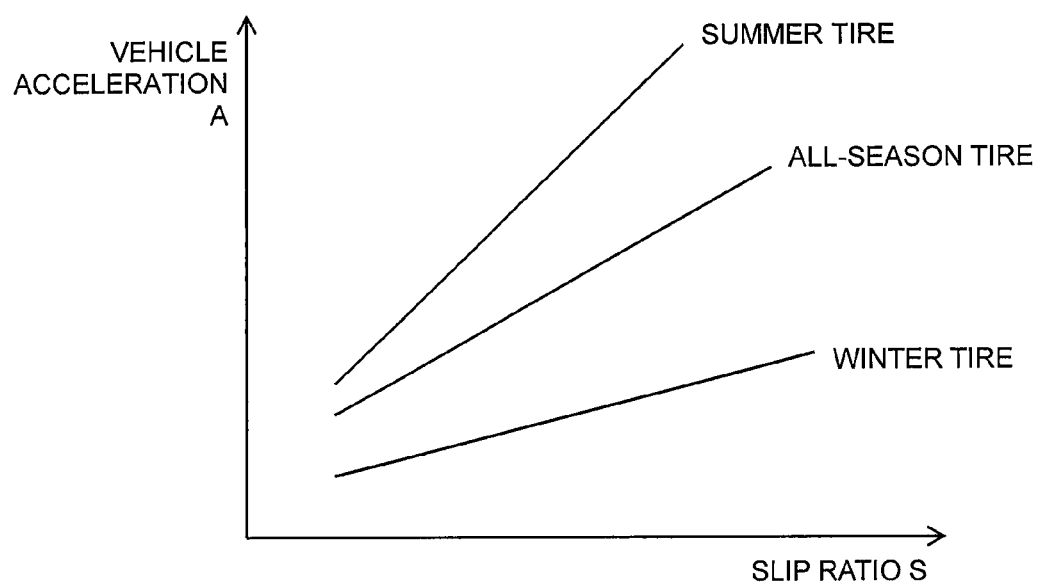
FIG. 7 is a conceptual diagram for explaining dependence of tire characteristics on a tire type.

According to the comparative example, the wear degree is estimated by referring only to magnitude of the tire coefficient. However, as shown in FIG. 7, the magnitude of the tire coefficient depends not only on the wear degree but also on a tire type. Therefore, the magnitude of the tire coefficient does not necessarily accurately reflect the wear degree. It is not possible to accurately estimate the wear degree only from the magnitude of the tire coefficient.

On the other hand, the amount of relative change in the tire coefficient from the initial value is almost the same regardless of the tire type. Therefore, the method according to the present embodiment can estimate the wear degree with high accuracy, regardless of the tire type.

3-3. Rear Wear Promotion Processing and Return Processing

As described above, when the wear degree parameter WP increases, the calculated target yaw rate Yr_st deviates from the actual steering characteristic and becomes higher than the actual yaw rate Yr. This causes the unnecessary early activation of the vehicle stability control (see FIG. 3). Therefore, when the wear degree parameter WP obtained by the above-described wear degree calculation processing exceeds a first wear threshold Wth1, the "rear wear promotion processing" is started in order to decrease the wear degree parameter WP.

Figure 8:
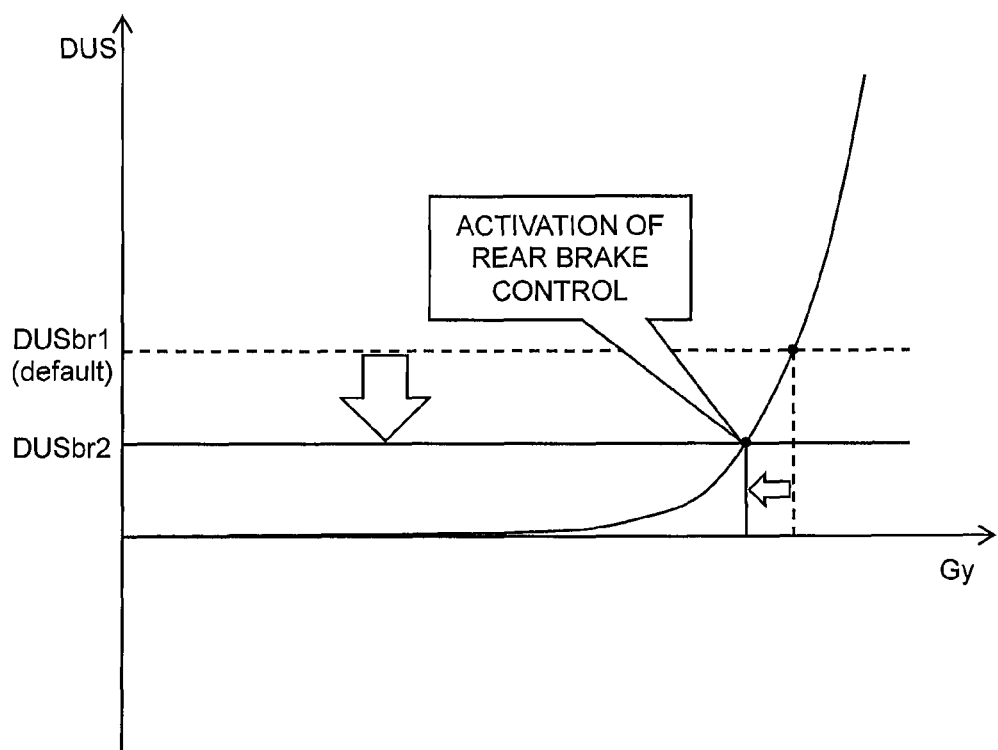
FIG. 8 is a conceptual diagram for explaining rear wear promotion processing in wear adjusting processing according to the embodiment of the present disclosure.

FIG. 8 is a conceptual diagram for explaining the rear wear promotion processing according to the present embodiment. The format of FIG. 8 is the same as the foregoing FIG. 5. In response to a fact that the wear degree parameter WP exceeds the first wear threshold Wth1, the second activation threshold DUSbr for the rear brake control is changed from the default value DUSbr1 to an "adjusted value DUSbr2". The adjusted value DUSbr2 is smaller than the default value DUSbr1 and the first activation threshold DUSth.

Figure 9:
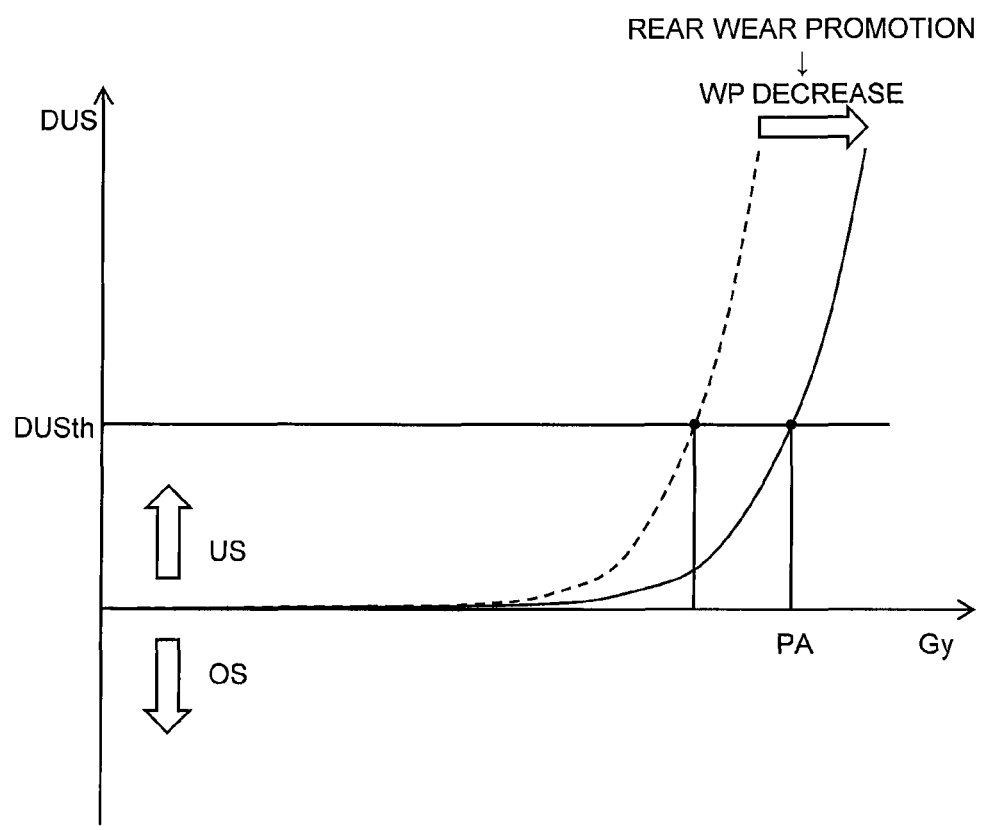
FIG. 9 is a conceptual diagram for explaining an effect of the rear wear promotion processing in the wear adjusting processing according to the embodiment of the present disclosure.

Since the second activation threshold DUSbr is decreased to the adjusted value DUSbr2 smaller than the default value DUSbr1, the rear brake control becomes more easily activated. In other words, a frequency of activation of the rear brake control becomes higher. Moreover, since the adjusted value DUSbr2 is smaller than the first activation threshold DUSth, the rear brake control is first activated before the vehicle stability control is activated. As a result, the wear of the rear tire 10R is effectively promoted. When the wear of the rear tire 10R is promoted, the difference in the wear degree between the front tire 10F and the rear tire 10R decreases and thus the wear degree parameter WP decreases. Consequently, as shown in FIG. 9, the activation point PA becomes later. That is, it is possible to suppress the unnecessary early activation of the vehicle stability control.

Figure 10:
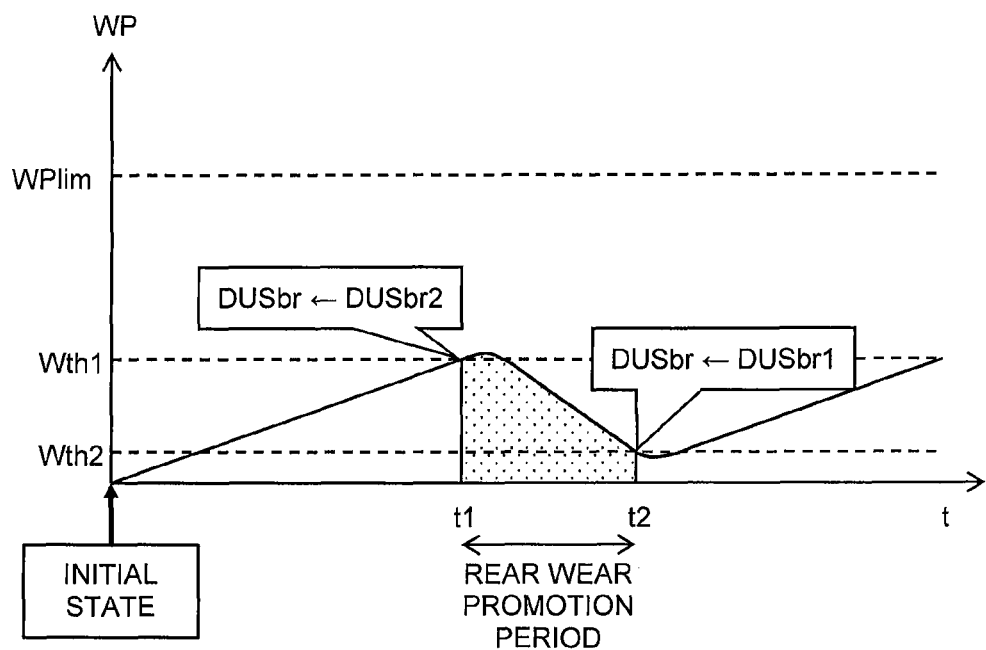
FIG. 10 is a timing chart for explaining the wear adjusting processing according to the embodiment of the present disclosure.

FIG. 10 is a timing chart for explaining the wear adjusting processing according to the present embodiment. A horizontal axis represents a travel time, and a vertical axis represents the wear degree parameter WP. In the initial state, the wear degree parameter WP is zero. The wear degree parameter WP increases as the travel time increases.

At a time t1, the wear degree parameter WP exceeds the first wear threshold Wth1. In response to the fact that the wear degree parameter WP exceeds the first wear threshold Wth1, the rear wear promotion processing is started. In the rear wear promotion processing, the second activation threshold DUSbr is decreased to the adjusted value DUSbr2 smaller than the default value DUSbr1. As a result, increase in the wear degree parameter WP is suppressed and the wear degree parameter WP gradually decreases.

After that, at a time t2, the wear degree parameter WP falls below a second wear threshold Wth2. The second wear threshold Wth2 is smaller than the first wear threshold Wth1 (Wth1>Wth2). In response to the fact that the wear degree parameter WP falls below the second wear threshold Wth2, the rear wear promotion processing ends and the second activation threshold DUSbr is returned from the adjusted value DUSbr2 to the default value DUSbr1. This processing is hereinafter referred to as "return processing". Since the return processing is performed, the rear tire 10R is prevented from wearing more than necessary and the rear wear degree Wr is prevented from exceeding the front wear degree Wf.

It should be noted that WPlim in FIG. 10 represents an allowable upper limit of the wear degree parameter WP. For example, the allowable upper limit WPlim is a value corresponding to the acceptable activation line for the vehicle stability control shown in FIG. 3. Both the first wear threshold Wth1 and the second wear threshold Wth2 described above are smaller than the allowable upper limit WPlim.

A period from the time t1 to the time t2 in FIG. 10 is a "rear wear promotion period". In the rear wear promotion period, the frequency of activation of the rear brake control increases as described above. A frequent intervention of the rear brake control may cause a driver to have a feeling of strangeness. In order to reduce such the feeling of strangeness, it is preferable to set a strength of the rear brake control in the rear wear promotion period weaker than usual.

Figure 11:
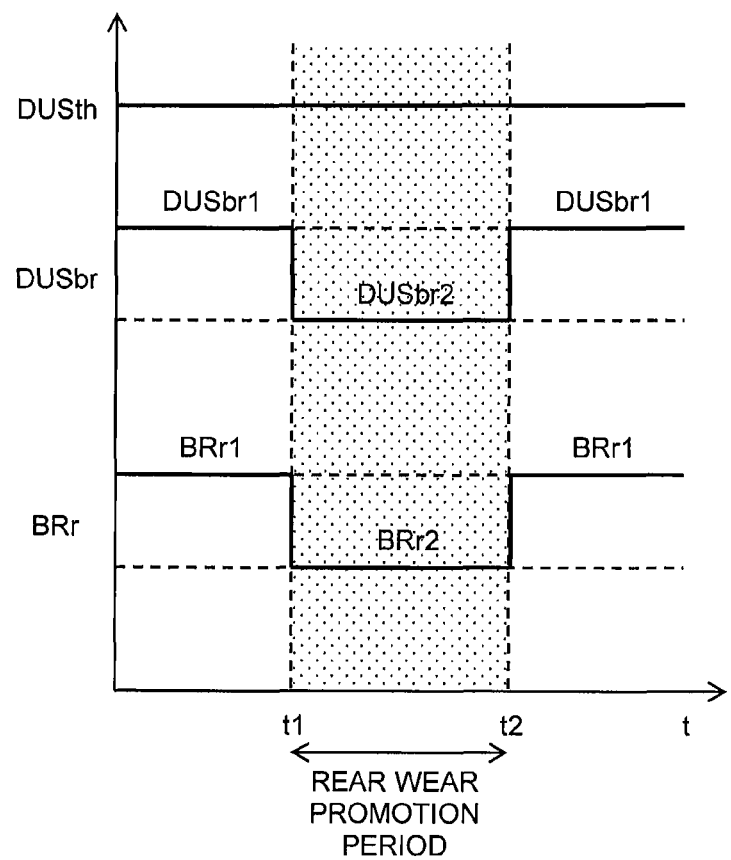
FIG. 11 is a timing chart for explaining an example of parameter setting in a rear wear promotion period in the embodiment of the present disclosure.

FIG. 11 is a timing chart for explaining an example of parameter setting in the rear wear promotion period. In a period other than the rear wear promotion period, the second activation threshold DUSbr is set to the default value DUSbr1. In the rear wear promotion period, the second activation threshold DUSbr is set to the adjusted value DUSbr2 smaller than the default value DUSbr1. It should be noted that the first activation threshold DUSth for the vehicle stability control is constant regardless of the rear wear promotion period.

Here, let us consider a "rear brake control amount BRr" in the rear brake control. The rear brake control amount BRr is a control amount of the braking force applied to the inner rear wheel 10RI in the rear brake control. The rear brake control amount BRr in the period other than the rear wear promotion period is a normal value BRr1. On the other hand, the rear brake control amount BRr in the rear wear promotion period is set to a suppressed value BRr2 smaller than the normal value BRr1. By suppressing the rear brake control amount BRr in the rear wear promotion period to be smaller than usual, it is possible to reduce the feeling of strangeness caused by the frequent intervention of the rear brake control.

4. Vehicle Stability Control Device

4-1. Configuration Example

Figure 12:
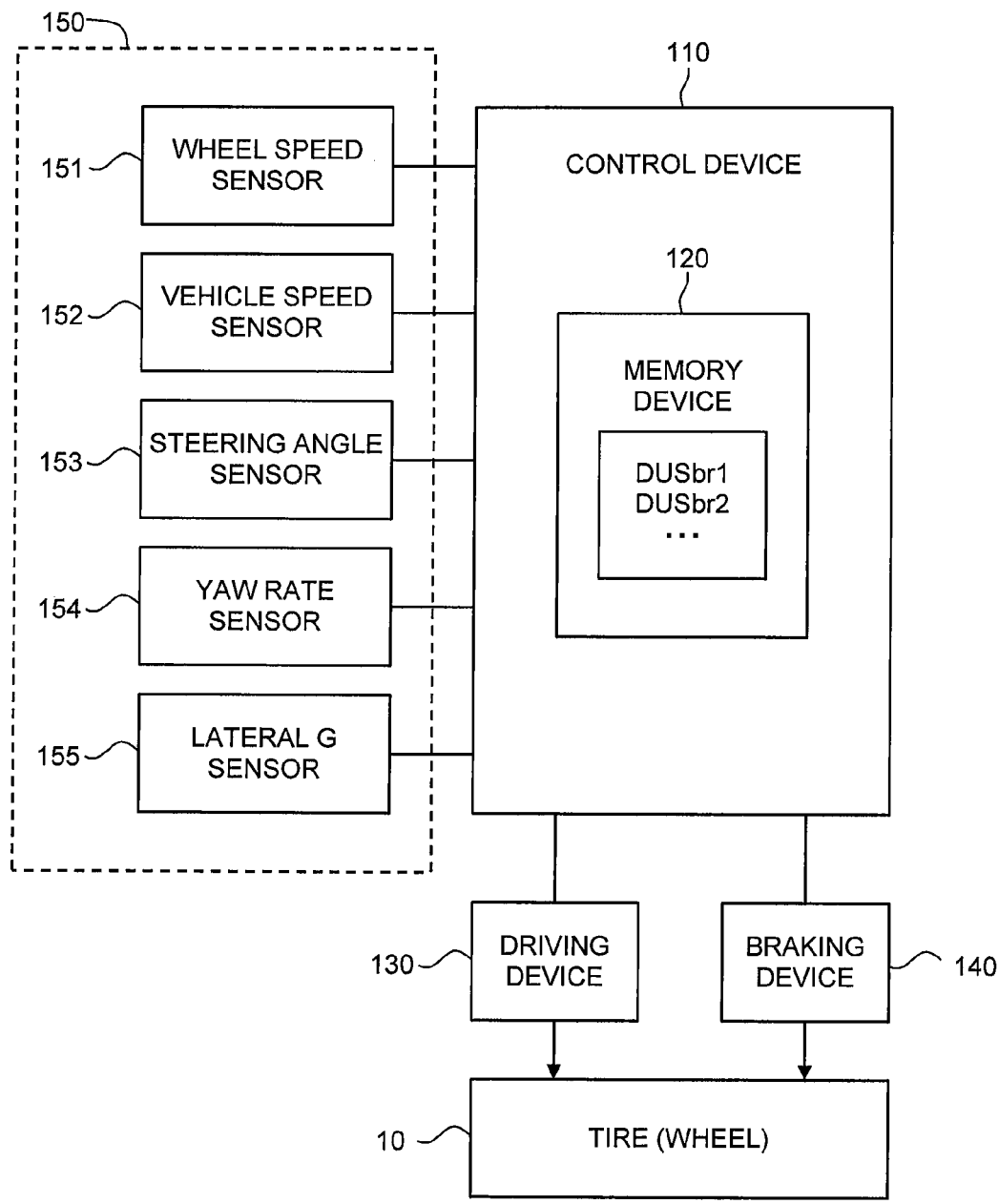
FIG. 12 is a block diagram schematically showing a configuration example of a vehicle stability control device according to the embodiment of the present disclosure.

FIG. 12 is a block diagram schematically showing a configuration example of a vehicle stability control device 100 according to the present embodiment. The vehicle stability control device 100 is mounted on the vehicle 1 and performs the vehicle stability control processing and the wear adjusting processing described above. The vehicle stability control device 100 is provided with a control device 110, a memory device 120, a driving device 130, a braking device 140, and a sensor group 150.

The control device 110 controls travel of the vehicle 1. Typically, the control device 110 is a microcomputer including a processor and the memory device 120. The control device 110 is also called an ECU (Electronic Control Unit). A control program is stored in the memory device 120. A variety of processing by the control device 110 is achieved by the processor executing the control program stored in the memory device 120. The variety of processing by the control device 110 includes the vehicle stability control processing and the wear adjusting processing described above.

A variety of parameters used for the processing by the control device 110 also is stored in the memory device 120. The variety of parameters includes a variety of thresholds. The variety of thresholds includes the default value DUSbr1 and the adjusted value DUSbr2 of the second activation threshold DUSbr used for the rear brake control. The control device 110 reads the parameters necessary for control from the memory device 120 and uses them.

The driving device 130 applies the driving force to each tire 10 (wheel). The driving device 130 is exemplified by an engine, an electric motor, an in-wheel motor, and so forth.

The braking device 140 applies the braking force to each tire 10. The braking device 140 includes a brake actuator and is capable of independently controlling the braking force with respect to each tire 10.

The sensor group 150 detects a travel state of the vehicle 1. For example, the sensor group 150 includes a wheel speed sensor 151, a vehicle speed sensor 152, a steering angle sensor 153, a yaw rate sensor 154, and a lateral acceleration sensor 155. The wheel speed sensor 151 is provided to each wheel and detects a wheel speed Vw of each wheel. The vehicle speed sensor 152 detects the vehicle speed V. The steering angle sensor 153 detects the steering angle St. The yaw rate sensor 154 detects the actual yaw rate Yr. The lateral acceleration sensor 155 detects the lateral acceleration Gy. The sensor group 150 transmits the detected information to the control device 110.

4-2. Vehicle Stability Control Processing

The control device 110 performs the vehicle stability control processing. More specifically, the control device 110 calculates the target yaw rate Yr_st. As shown in the above equation (1), the target yaw rate Yr_st is given as a function of the vehicle speed V and the steering angle St. The vehicle speed V is detected by the vehicle speed sensor 152. Alternatively, the vehicle speed V may be calculated from the wheel speed Vw of each wheel detected by the wheel speed sensor 151. The steering angle St is detected by the steering angle sensor 153.

Moreover, the control device 110 calculates the understeer degree DUS (see the above equations (2) and (3)). The actual yaw rate Yr is detected by the yaw rate sensor 154. The understeer degree DUS increases as the target yaw rate Yr_st becomes larger than the actual yaw rate Yr.

When the understeer degree DUS exceeds the first activation threshold DUSth, the control device 110 activates the vehicle stability control. In the vehicle stability control, the control device 110 controls at least one of the braking force and the driving force of each wheel to stabilize the vehicle behavior. Control of the braking force is performed through the braking device 140. Control of the driving force is performed through the driving device 130. The vehicle stability control is a publicly-known technique and a detailed description thereof is omitted here.

4-3. Wear Adjusting Processing

The control device 110 performs the wear adjusting processing. More specifically, the control device 110 calculates the understeer degree DUS (see the above equations (2) and (3)). When the understeer degree DUS exceeds the second activation threshold DUSbr, the control device 110 activates the rear brake control. The setting value of the second activation threshold DUSbr is stored in the memory device 120. In the rear brake control, the control device 110 generates the assist yaw moment YMA by applying the braking force to the inner rear wheel 10RI (see FIG. 4). Control of the braking force is performed through the braking device 140.

Moreover, the control device 110 performs the wear degree calculation processing that calculates the wear degree parameter WP. The wear degree parameter WP is the difference between the front wear degree Wf and the rear wear degree Wr (i.e. WP=Wf−Wr) or the front wear degree Wf (i.e. WP=Wf).

For example, the control device 110 calculates each wear degree based on the tire coefficient. As described above, the tire coefficient is the slope of the line representing the relationship between the slip ratio S of the tire 10 and the vehicle acceleration A. The slip ratio S is calculated from the vehicle speed V and the wheel speed Vw. The vehicle acceleration A is calculated from the vehicle speed V.

Calculation of the front wear degree Wf is as follows. The control device 110 calculates, as the front tire coefficient Kf, the slope of the line representing the relationship between the slip ratio Sf of the front tire 10F and the vehicle acceleration A. The control device 110 retains the initial value of the front tire coefficient Kf as the initial front tire coefficient KfM in the memory device 120. Then, the control device 110 calculates, as the front wear degree Wf, the amount of change in the front tire coefficient Kf from the initial front tire coefficient KfM.

Calculation of the rear wear degree Wr is as follows. The control device 110 calculates, as the rear tire coefficient Kr, the slope of the line representing the relationship between the slip ratio Sr of the rear tire 10R and the vehicle acceleration A. The control device 110 retains the initial value of the rear tire coefficient Kr as the initial rear tire coefficient KrM in the memory device 120. Then, the control device 110 calculates, as the rear wear degree Wr, the amount of change in the rear tire coefficient Kr from the initial rear tire coefficient KrM.

In response to a fact that the calculated wear degree parameter WP exceeds the first wear threshold Wth1, the control device 110 starts the rear wear promotion processing. More specifically, the control device 110 changes the second activation threshold DUSbr for the rear brake control to the adjusted value DUSbr2 (see FIG. 10). The adjusted value DUSbr2 is stored in the memory device 120.

Moreover, in response to a fact that the wear degree parameter WP falls below the second wear threshold Wth2, the control device 110 performs the return processing. More specifically, the control device 110 returns the second activation threshold DUSbr for the rear brake control to the default value DUSbr1 (see FIG. 10). The default value DUSbr1 is stored in the memory device 120.

Hereinafter, various examples of a processing flow of the wear adjusting processing by the control device 110 will be described.

5. Various Examples of Flow of Wear Adjusting Processing

5-1. First Example

In a first example, the wear degree parameter WP is the front wear degree Wf of the front tire 10F. In the case where only the front wear degree Wf is used, an effect of reduction in computation load of the control device 110 can be obtained.

Figure 13:
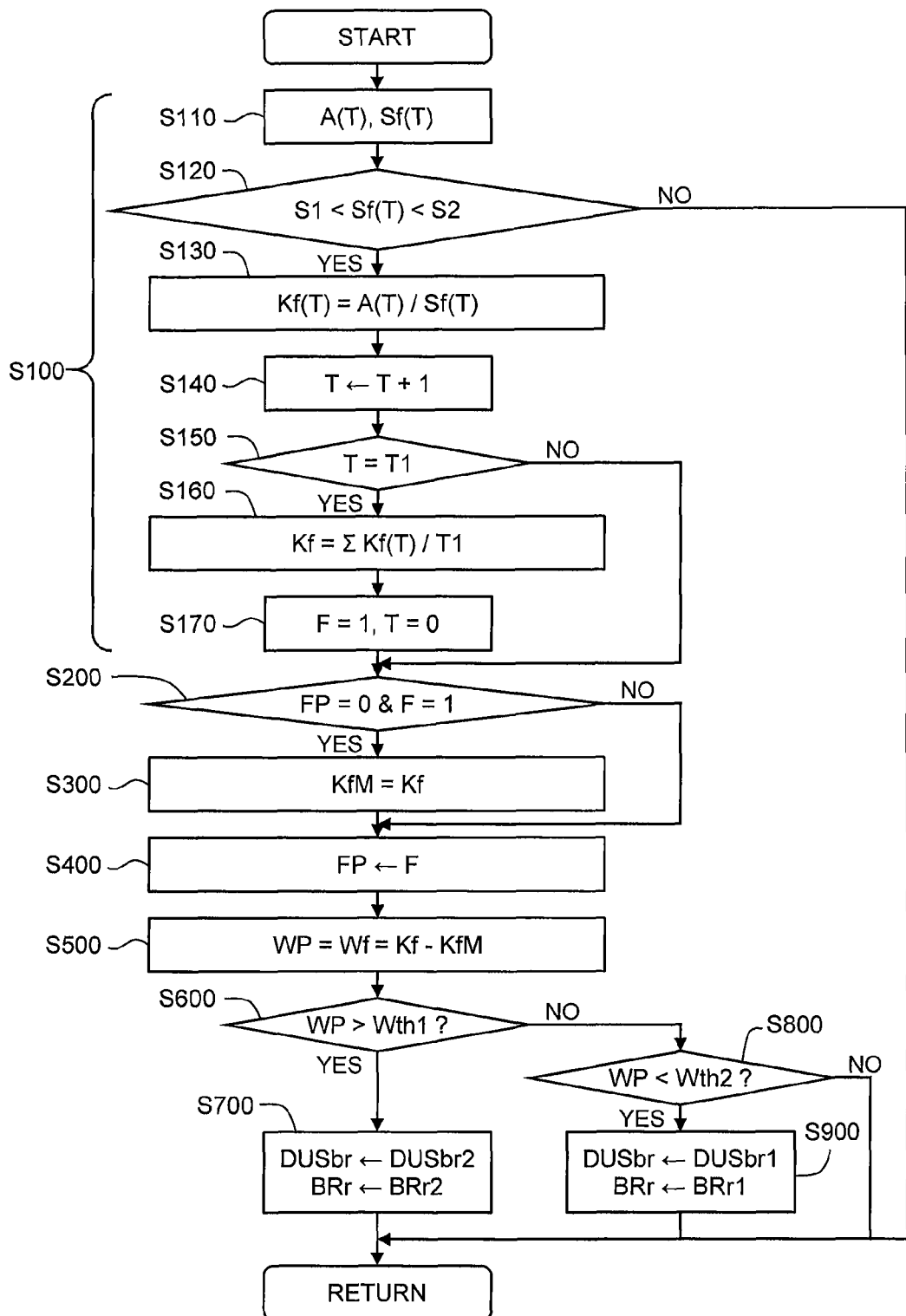
FIG. 13 is a flow chart showing a first example of the wear adjusting processing according to the embodiment of the present disclosure.

FIG. 13 is a flow chart showing the first example. The processing flow shown in FIG. 13 is repeatedly executed every certain cycle.

In the processing flow described below, a parameter F is a status flag indicating whether or not any tire coefficient calculated after initialization exists. When the status flag F is "0", there is no tire coefficient calculated after the initialization. When the status flag F is "1", there is any tire coefficient calculated after the initialization. A previous status flag FP indicates a previous value of the status flag F. In the present example, both the status flag F and the previous status flag FP are initialized to "0" in an assembly line of the vehicle 1. Moreover, at timings of tire change and tire rotation, both the status flag F and the previous status flag FP are artificially initialized to "0" by the use of a diagnosis tool and the like. The status flag F and the previous status flag FP are still retained even after ignition OFF.

In Step S100, the control device 110 calculates the front tire coefficient Kf and retains it in the memory device 120. More specifically, in Step S110, the control device 110 calculates the vehicle acceleration A(T) and the slip ratio Sf(T) of the front tire 10F. Here, T is a counter and its initial value is "0".

In Step S120, the control device 110 determines whether or not the slip ratio Sf(T) is within a calculation allowable range. The calculation allowable range is a range in which there is a proportional relationship between the vehicle acceleration A and the slip ratio Sf. The calculation allowable range is defined as a range between a lower limit S1 and an upper limit S2. When the slip ratio Sf(T) is within the calculation allowable range (Step S120; Yes), the processing proceeds to Step S130. Otherwise (Step S120; No), the processing in the current cycle ends.

In Step S130, the control device 110 calculates a ratio Kf(T) of the vehicle acceleration A(T) to the slip ratio Sf(T). In the subsequent Step S140, the control device 110 increments the counter T. When the counter T is less than a predetermined value T1 (Step S150; No), the processing proceeds to Step S200.

When the counter T reaches the predetermined value T1 (Step S150; Yes), the processing proceeds to Step S160. In Step S160, the control device 110 calculates an average value of the T1 ratios Kf(T) as the front tire coefficient Kf. In the subsequent Step S170, the control device 110 sets the status flag F to "1" and resets the counter T. After that, the processing proceeds to Step S200.

In Step S200, the control device 110 determines whether or not the previous status flag FP is "0" and the status flag F is "1". When the previous status flag FP is "0" and the status flag F is "1" (Step S200; Yes), the processing proceeds to Step S300. Otherwise (Step S200; No), the processing proceeds to Step S400.

In Step S300, the control device 110 retains the front tire coefficient Kf as the initial front tire coefficient KfM in the memory device 120. After that, the processing proceeds to Step S400. It should be noted that the initial front tire coefficient KfM is still retained even after ignition OFF.

In Step S400, the control device 110 updates the value of the previous status flag FP to the status flag F.

In Step S500, the control device 110 calculates the wear degree parameter WP. In the present example, the wear degree parameter WP is the front wear degree Wf that is given by the amount of change in the front tire coefficient Kf from the initial front tire coefficient KfM.

In Step S600, the control device 110 determines whether or not the the wear degree parameter WP is larger than the first wear threshold Wth1. When the wear degree parameter WP is larger than the first wear threshold Wth1 (Step S600; Yes), the processing proceeds to Step S700. Otherwise (Step S600; No), the processing proceeds to Step S800.

In Step S700, the control device 110 performs the rear wear promotion processing. More specifically, the control device 110 sets the second activation threshold DUSbr to the adjusted value DUSbr2. Moreover, the control device 110 sets the rear brake control amount BRr to the suppressed value BRr2.

In Step S800, the control device 110 determines whether or not the wear degree parameter WP is smaller than the second wear threshold Wth2. When the wear degree parameter WP is smaller than the second wear threshold Wth2 (Step S800; Yes), the processing proceeds to Step S900. Otherwise (Step S800; No), the processing in the current cycle ends.

In Step S900, the control device 110 performs the return processing. More specifically, the control device 110 sets the second activation threshold DUSbr to the default value DUSbr1. Moreover, the control device 110 sets the rear brake control amount BRr to the normal value BRr1.

5-2. Second Example

In a second example, the wear degree parameter WP is the difference (Wf−Wr) between the front wear degree Wf and the rear wear degree Wr. By using both the front wear degree Wf and the rear wear degree Wr, it is possible to more accurately consider the influence of the tire wear.

Figure 14:
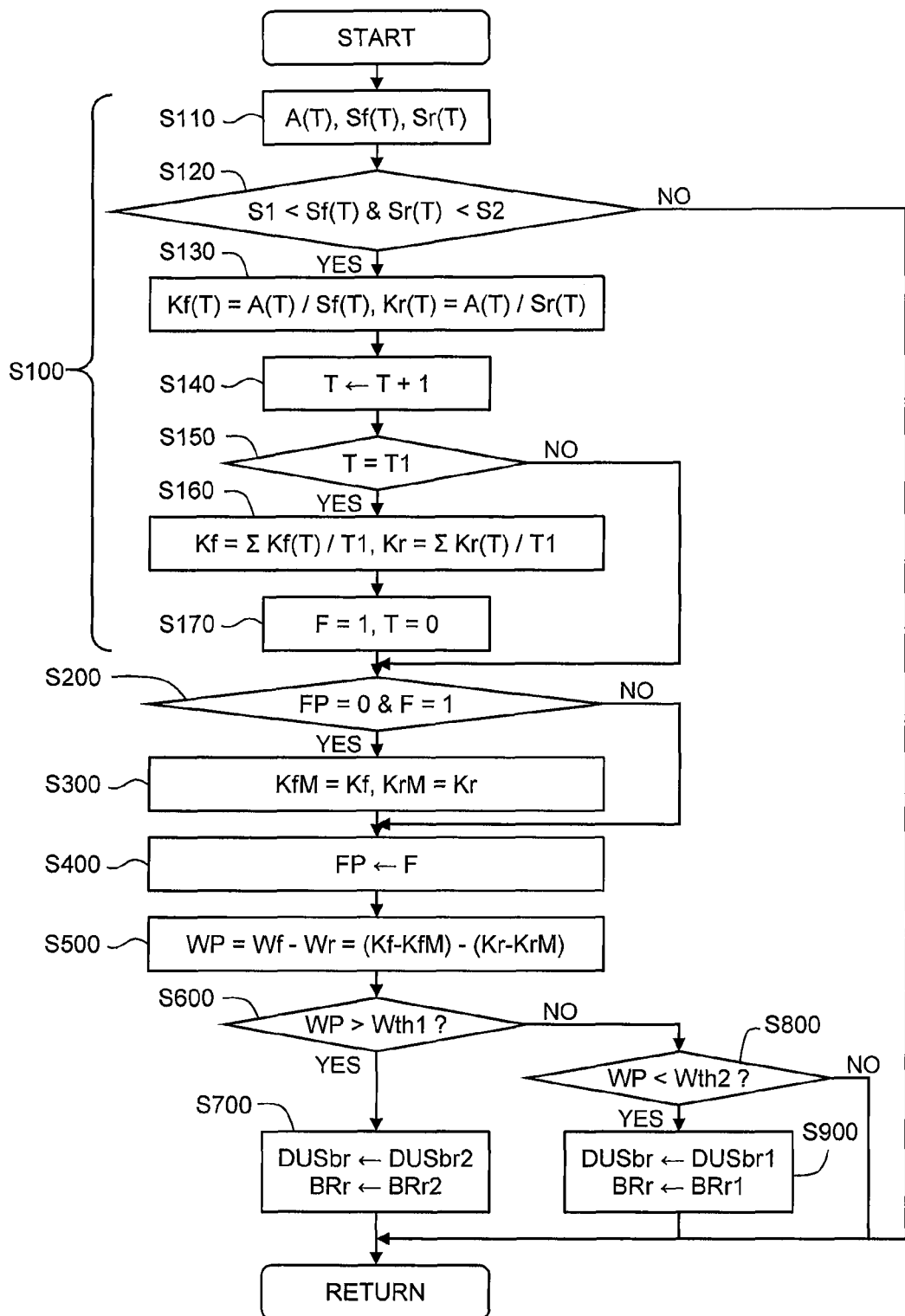
FIG. 14 is a flow chart showing a second example of the wear adjusting processing according to the embodiment of the present disclosure.

FIG. 14 is a flow chart showing the second example. It should be noted that the same Step number is given to the same or similar processing as in the first example, and an overlapping description will be omitted as appropriate.

In Step S100, the control device 110 calculates the front tire coefficient Kf and the rear tire coefficient Kr and retains them in the memory device 120. More specifically, in Step S110, the control device 110 calculates the vehicle acceleration A(T), the slip ratio Sf(T) of the front tire 10F, and the slip ratio Sr(T) of the rear tire 10R. In Step S120, the control device 110 determines whether or not both the slip ratio Sf(T) and the slip ratio Sr(T) are within the calculation allowable range. In Step S130, the control device 110 calculates the ratio Kf(T) and a ratio Kr(T). In Step S160, the control device 110 calculates an average value of the T1 ratios Kf(T) as the front tire coefficient Kf, and calculates an average value of the T1 ratios Kr(T) as the rear tire coefficient Kr.

In Step S300, the control device 110 retains the front tire coefficient Kf as the initial front tire coefficient KfM in the memory device 120. Moreover, the control device 110 retains the rear tire coefficient Kr as the initial rear tire coefficient KrM in the memory device 120.

In Step S500, the control device 110 calculates the wear degree parameter WP. In the present example, the wear degree parameter WP is the difference (Wf−Wr) between the front wear degree Wf and the rear wear degree Wr. The front wear degree Wf is given by the amount of change in the front tire coefficient Kf from the initial front tire coefficient KfM. The rear wear degree Wr is given by the amount of change in the rear tire coefficient Kr from the initial rear tire coefficient KrM.

The other processing is similar to that in the case of the first example.

5-3. Third Example

In a third example, the wear degree is calculated based on an "estimated tire radius Ra" instead of the above-described "tire coefficient". The estimated tire radius Ra is an estimated value of a tire radius and can be obtained, for example, by a method disclosed in the above-mentioned Patent Literature 2 (Japanese Laid-Open Patent Publication No. 2008-247126).

Figure 15:
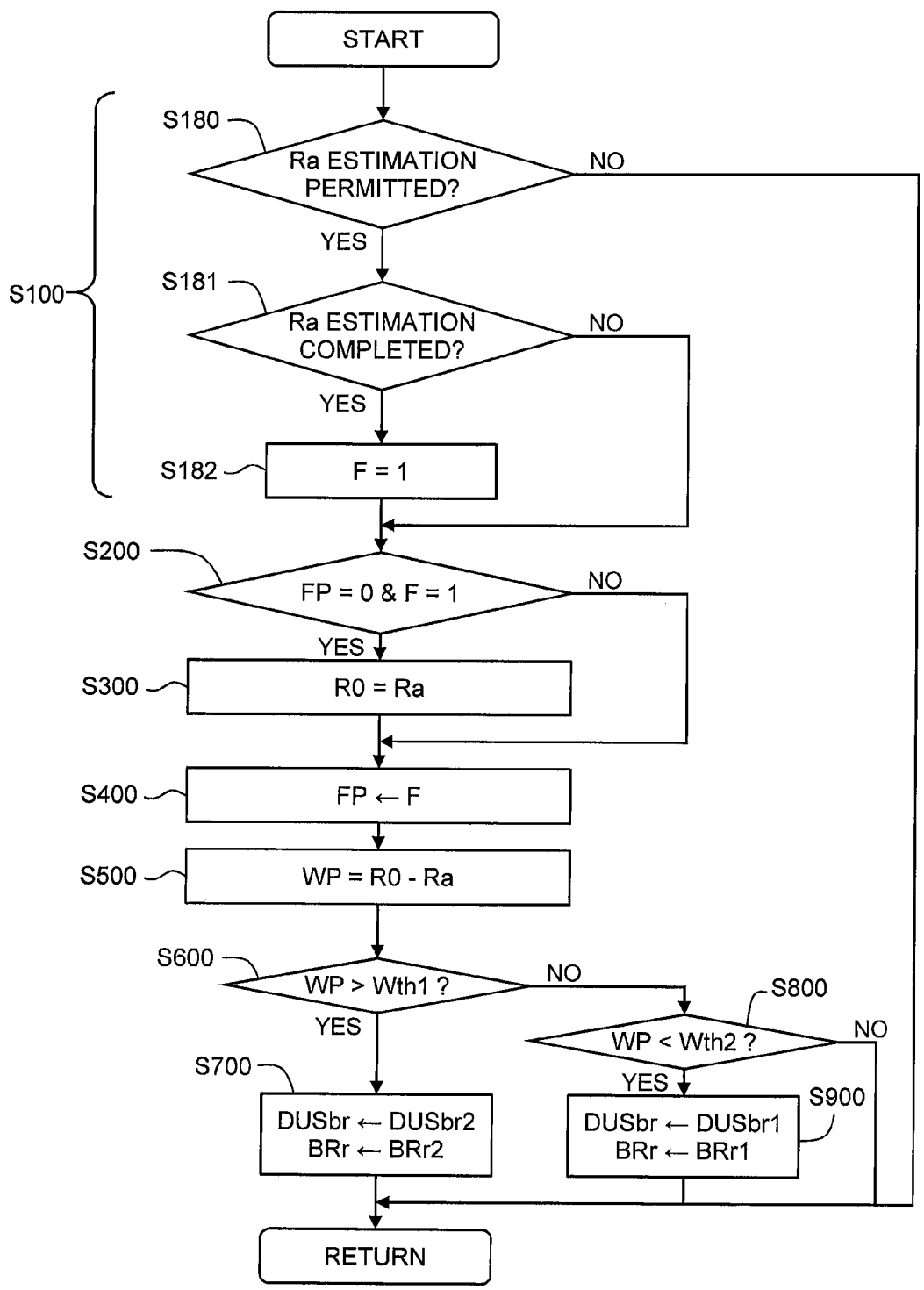
FIG. 15 is a flow chart showing a third example of the wear adjusting processing according to the embodiment of the present disclosure.

FIG. 15 is a flow chart showing the third example. It should be noted that the same Step number is given to the same or similar processing as in the first example, and an overlapping description will be omitted as appropriate.

In Step S100, the control device 110 obtains the estimated tire radius Ra and retains it in the memory device 120. More specifically, in Step S180, the control device 110 determines whether or not the estimation processing is permitted. When the estimation processing is not permitted (Step S180; No), the processing in the current cycle ends. When the estimation processing is permitted (Step S180; Yes), the control device 110 starts the estimation processing. When the estimation is not yet completed (Step S181; No), the processing proceeds to Step S200. When the estimation processing is completed (Step S181; Yes), the control device 110 sets the status flag F to "1" (Step S182). After that, the processing proceeds to Step S200.

In Step S300, the control device 110 retains the estimated tire radius Ra as an initial estimated tire radius R0 in the memory device 120.

In Step S500, the control device 110 calculates the wear degree parameter WP. In the present example, the wear degree parameter WP is an amount of change in the estimated tire radius Ra from the initial estimated tire radius R0.

The other processing is similar to that in the case of the first example.

5-4. Fourth Example

In the first to third examples described above, the status flag F and the previous status flag FP are artificially initialized to "0" at the timings of tire change and tire rotation. In a fourth example, on the other hand, the status flag F and the previous status flag FP are automatically initialized when an initialization condition is satisfied. The initialization condition is exemplified by ignition OFF, stopping for a predetermined time or more, and so forth.

Figure 16:
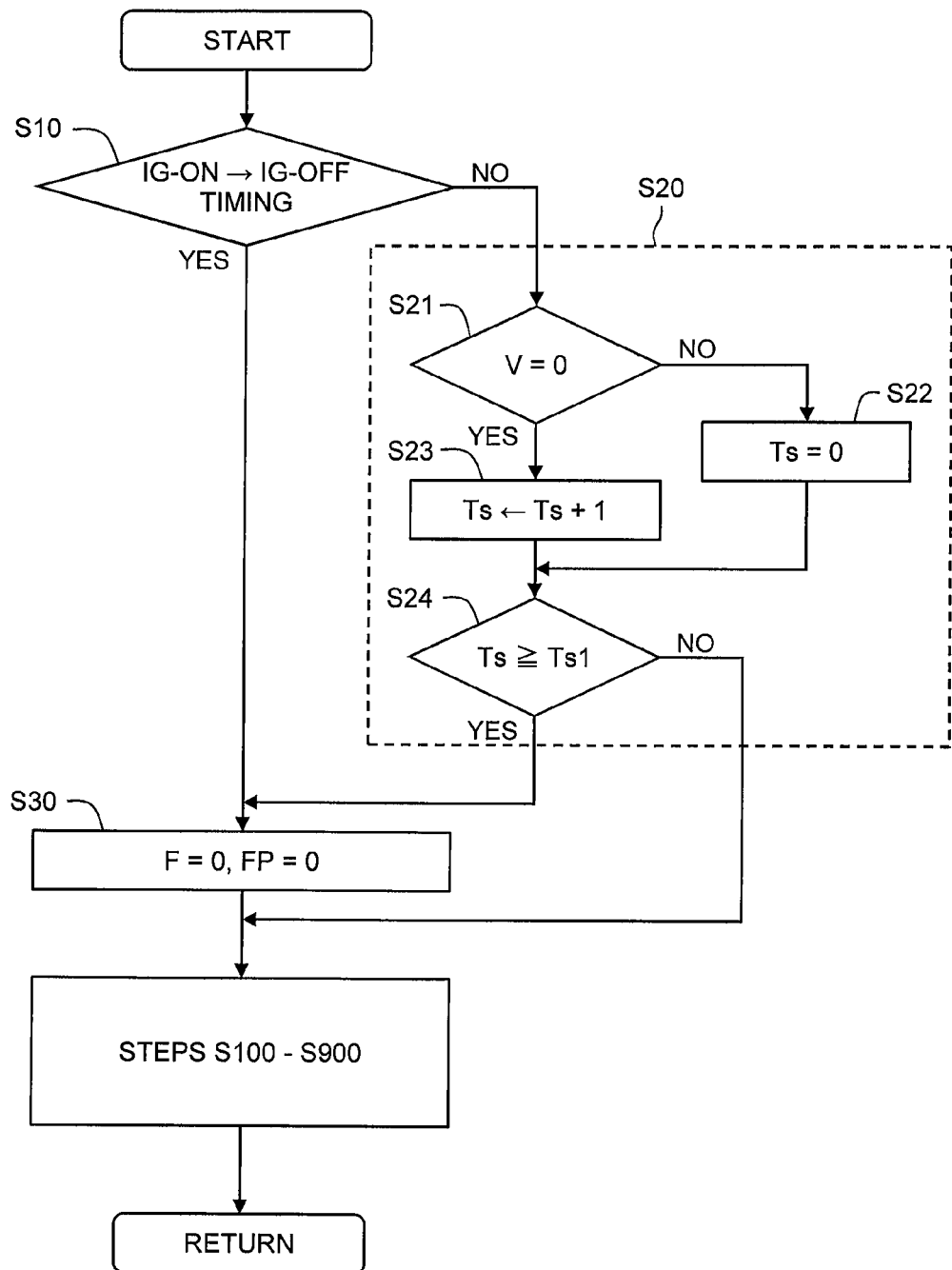
FIG. 16 is a flow chart showing a fourth example of the wear adjusting processing according to the embodiment of the present disclosure.

FIG. 16 is a flow chart showing the fourth example. In Step S10, the control device 110 determines whether or not it is an ignition OFF timing. When it is the ignition OFF timing (Step S10; Yes), the processing proceeds to Step S30. Otherwise (Step S10; No), the processing proceeds to Step S20.

In Step S20, the control device 110 determines whether or not the vehicle 1 is in the stop state for a predetermined time Ts1 or more. The predetermined time Ts1 is set to about a time required for the tire change. More specifically, in Step S21, the control device 110 determines based on the vehicle speed V whether the vehicle 1 is in the stop state. When the vehicle 1 is not in the stop state (Step S21; No), the control device 110 resets a stop time Ts (Step S22). On the other hand, when the vehicle 1 is in the stop state (Step S21; Yes), the control device 110 increments the stop time Ts (Step S23). When the stop time Ts is equal to or more than the predetermined time Ts1 (Step S24; Yes), the processing proceeds to Step S30. Otherwise (Step S24; No), the processing proceeds to Step S100.

In Step S30, the control device 110 initializes both the status flag F and the previous status flag FP to "0".

After that, Steps S100 to S900 are performed. Steps S100 to S900 are the same as in the case of any of the first to third examples described above.

What is claimed is:

1. A vehicle stability control device mounted on a vehicle in which a front tire wears faster than a rear tire,
    the vehicle stability control device comprising a control device configured to perform vehicle stability control processing and wear adjusting processing,
    the vehicle stability control processing comprising:
        calculating a target yaw rate according to a vehicle speed and a steering angle;
        calculating understeer degree that increases as the target yaw rate becomes higher than an actual yaw rate; and
        controlling at least one of a braking force and a driving force of each wheel to stabilize vehicle behavior, when the understeer degree exceeds a first activation threshold,
    the wear adjusting processing comprising:
        rear brake control that applies a braking force to an inner rear wheel when the understeer degree exceeds a second activation threshold;
        wear degree calculation processing that calculates a wear degree parameter being wear degree of the front tire or a difference in wear degree between the front tire and the rear tire; and
        rear wear promotion processing that changes the second activation threshold to an adjusted value smaller than a default value and the first activation threshold in response to a fact that the wear degree parameter exceeds a first wear threshold.

2. The vehicle stability control device according to claim 1, wherein
    the wear adjusting processing further comprises:
        return processing that returns the second activation threshold to the default value in response to a fact that the wear degree parameter falls below a second wear threshold smaller than the first wear threshold.

3. The vehicle stability control device according to claim 1, wherein
    a control amount of the braking force applied to the inner rear wheel in the rear brake control is a rear brake control amount, and
    the control device sets the rear brake control amount when the second activation threshold is the adjusted value to be smaller than the rear brake control amount when the second activation threshold is the default value.

4. The vehicle stability control device according to claim 1, wherein
    the wear degree calculation processing comprises:
        calculating, as a front tire coefficient, a slope of a line representing a relationship between a slip ratio of the front tire and a vehicle acceleration;
        retaining an initial value of the front tire coefficient as an initial front tire coefficient; and
        calculating an amount of change in the front tire coefficient from the initial front tire coefficient as the wear degree parameter representing the wear degree of the front tire.

5. The vehicle stability control device according to claim 1, wherein
    the wear degree calculation processing comprises:
        calculating, as a front tire coefficient, a slope of a line representing a relationship between a slip ratio of the front tire and a vehicle acceleration;
        calculating, as a rear tire coefficient, a slope of a line representing a relationship between a slip ratio of the rear tire and the vehicle acceleration;
        retaining an initial value of the front tire coefficient as an initial front tire coefficient;
        retaining an initial value of the rear tire coefficient as an initial rear tire coefficient; and
        calculating the wear degree parameter representing the difference in the wear degree between the front tire and the rear tire, wherein the wear degree of the front tire is an amount of change in the front tire coefficient from the initial front tire coefficient, and the wear degree of the rear tire is an amount of change in the rear tire coefficient from the initial rear tire coefficient.

* * * * *